United States Patent
Barnes et al.

(10) Patent No.: US 7,610,819 B2
(45) Date of Patent: Nov. 3, 2009

(54) TRANSMISSION HEADSTOCK FOR TEST STANDS

(75) Inventors: Ken Barnes, Northville, MI (US); Peter Posch, Lebring (AT); Wolfgang Kopecky, Lampertheim (DE); Walter Orth, Darmstadt (DE)

(73) Assignee: AVL North America Inc., Plymouth, MI (US)

( * ) Notice: Subject to any disclaimer, the term of this patent is extended or adjusted under 35 U.S.C. 154(b) by 532 days.

(21) Appl. No.: 11/496,804

(22) Filed: Aug. 1, 2006

(65) Prior Publication Data

US 2008/0126889 A1    May 29, 2008

(51) Int. Cl.
G01L 3/02 (2006.01)
(52) U.S. Cl. .................................. 73/862.31
(58) Field of Classification Search .............. 73/862.31; 714/704
See application file for complete search history.

(56) References Cited

U.S. PATENT DOCUMENTS

| | | | | |
|---|---|---|---|---|
| 2,547,845 | A * | 4/1951 | Andreasson | 451/394 |
| 2003/0088972 | A1 * | 5/2003 | Haimer | 29/700 |
| 2004/0211301 | A1 * | 10/2004 | Kobayashi et al. | 82/129 |
| 2007/0017109 | A1 * | 1/2007 | Guzik et al. | 33/613 |
| 2007/0108933 | A1 * | 5/2007 | Kegeler | 318/652 |
| 2007/0248428 | A1 * | 10/2007 | Ota | 409/201 |

OTHER PUBLICATIONS

Line Drawing, 1 page.
3-Dimensional Drawings, 2 pages.

* cited by examiner

*Primary Examiner*—Andre J Allen
(74) *Attorney, Agent, or Firm*—Carlson, Gaskey & Olds

(57) ABSTRACT

A mobile test unit for testing a powertrain component such as a transmission is used in a test cell. A test unit includes a movable, generally horizontal base plate, and a frame spaced from the base plate. A headstock is secured to the frame for supporting the transmission. An adjustable support, which is arranged on each of four corners of the frame in the example embodiment, interconnects the frame to the base plate. The adjustable supports are movable in a vertical direction, in one example, between multiple positions to achieve a desired orientation relative to the base plate. In particular, the orientation of the frame is adjusted to obtain a desired rotational and/or tilt angle that corresponds to a rotational and/or tilt angle of the transmission when installed into a vehicle. The transmission can be installed onto the test unit, and the test unit can be moved into and out of a test cell. The example test unit is capable of replicating the orientation of the transmission when installed in a vehicle to provide more representative test data. Furthermore, the adjustments to the test unit can be done outside of a test cell to increase the time during which the test cell can be utilized.

20 Claims, 5 Drawing Sheets

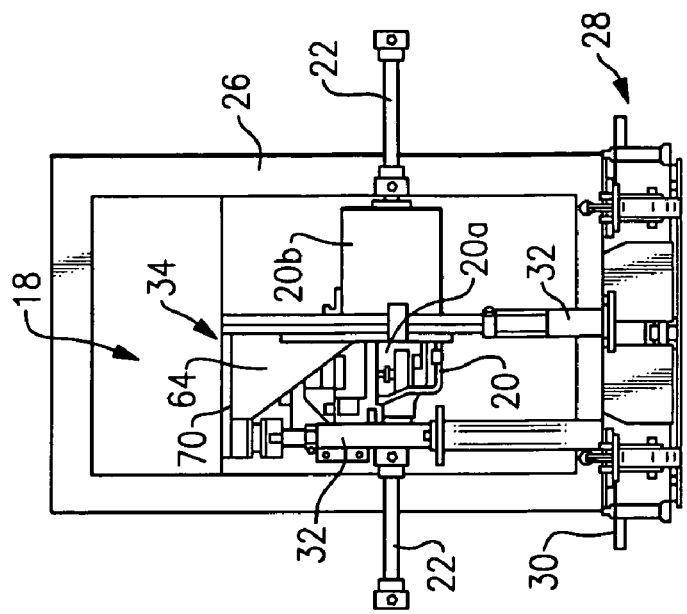
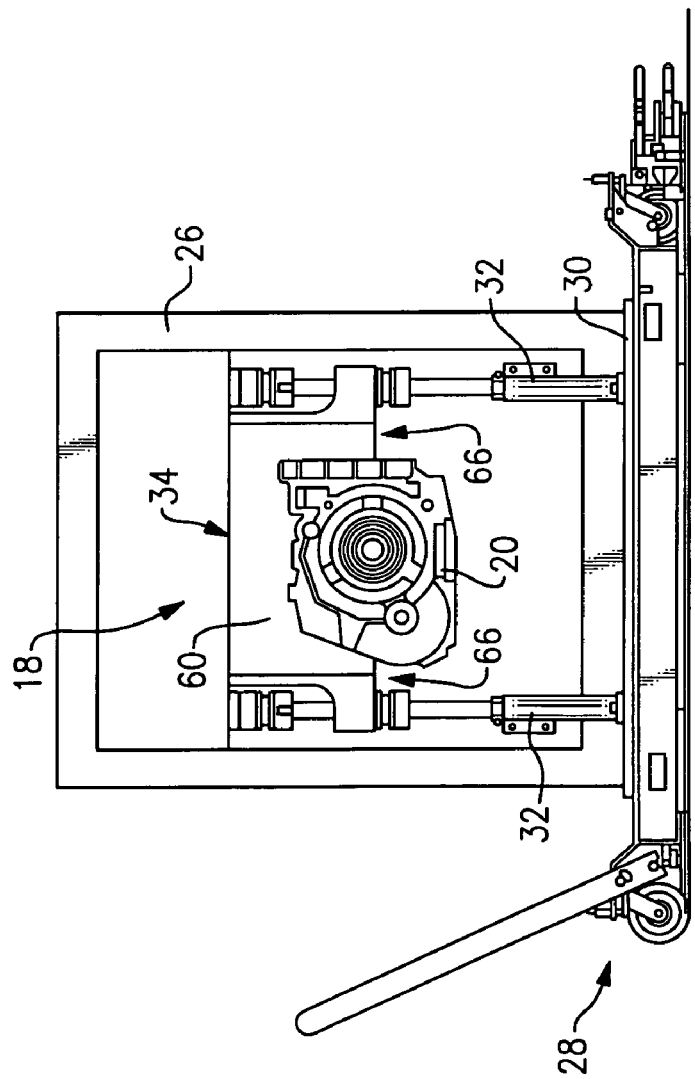

TRANSMISSION HEADSTOCK FOR TEST STANDS

BACKGROUND OF THE INVENTION

This invention relates to a fixture for supporting a vehicle transmission during a test procedure.

Transmissions are developed in test cells where the design and durability of the transmission can be evaluated. A typical test cell includes an electric motor for driving the transmission. A test cell may also include dynamometers that are coupled to one or more output shafts of the transmission. The test cell includes a test stand fixed to a bed plate that is permanently attached to the floor of the test cell. In preparation for a test, the transmission is brought into the test cell and fastened to the test stand. A unique headstock is used to support each type of transmission. Test stands are designed to avoid resonant frequencies (vibrations) in the operational speed range. To avoid resonances the fixtures are inherently stiff and heavy. Usually the test stand is not adjustable so that the rotational and tilting position of the transmission as it would be installed in a vehicle cannot be duplicated. As a result, the lubrication conditions of the transmission, for example, may not be accurately simulated by the transmission test.

Dynamometer test cells are very expensive so that it is important to maximize test cell time available to test transmissions. The installation and removal of transmissions in a test cell reduces the time that the test cell is available for a transmission test. To this end, there has been trend to provide carts that support the transmissions. The cart and transmission are rolled into the test cell and docked at a desired location within the test cell for testing.

Traditional test stands have been used with the carts. That is, a bed plate having a non-adjustable, fixed stand, secured to the bed plate. The solid, non-adjustable test stands have been used to prevent vibration of the transmission during testing.

What is needed is, adjustable test stand that is also portable. The requirement for portability and multi-axis adjustability requires a light but stiff headstock. A light structure which provides clear access to the transmission is to a certain amount flexible and consequently it is desirable to isolate unavoidable resonances by the use of damping elements.

SUMMARY OF THE INVENTION

A mobile test unit for testing a powertrain component such as a transmission is used in a test cell. A test unit includes a movable, generally horizontal base plate, and a frame spaced from the base plate. A headstock is secured to the frame for supporting the transmission. An adjustable support, which is arranged on each of four corners of the frame in the example embodiment, interconnects the frame to the base plate. The adjustable supports are movable in a vertical direction, in one example, between multiple positions to achieve a desired orientation relative to the base plate. In particular, the orientation of the frame is adjusted to obtain a desired rotational and/or tilt angle that corresponds to a rotational and/or tilt angle of the transmission when installed into a vehicle.

The transmission can be installed onto the test unit, and the test unit can be moved into and out of a test cell. The example test unit is capable of replicating the orientation of the transmission when installed in a vehicle to provide more representative test data. Furthermore, the adjustments to the test unit can be done outside of a test cell to increase the time during which the test cell can be utilized.

These and other features of the present invention can be best understood from the following specification and drawings, the following of which is a brief description.

BRIEF DESCRIPTION OF THE DRAWINGS

FIG. 2A is a front elevational view of a cart, shown in FIG. 1, having the example transmission test stand configured for cold testing a front wheel drive transmission.

FIG. 2B is a side elevational view of the cart and test stand shown in FIG. 2A.

DETAILED DESCRIPTION OF THE PREFERRED EMBODIMENT

Figure 1:
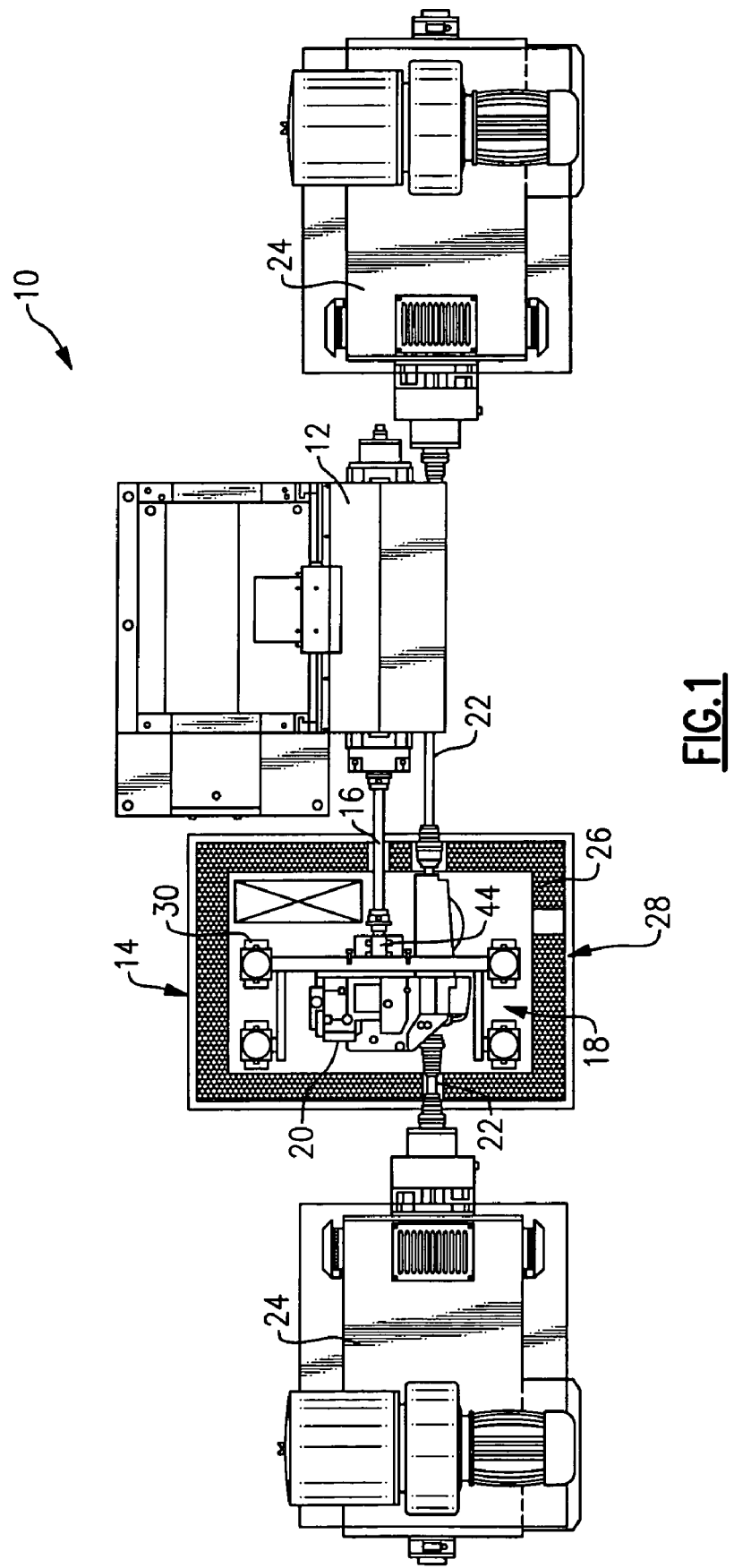
FIG. 1 is a top elevational view of an example test cell.

A test cell 10 is shown in FIG. 1. The test cell 10 includes an electric motor 12 for rotationally driving a transmission 20. The transmission 20 is part of a portable test unit 14 that can be moved into and out of test cells in a substantially ready-to-test state. The test unit 14 includes a portable cart 28 with a base plate 30 supporting a stand 18. The base plate 30 is supported on wheels in the example embodiment. The transmission 20 is mounted on the stand 18 and is connected to the electric motor 12 by a drive shaft 16.

The particular transmission 20 shown in FIG. 1 is for a front wheel drive arrangement. Output shafts 22 couple the transmission 20 to dynamometers 24, which exert a load on the transmission 20 for the type of test shown in FIG. 1. A loaded, cold test is shown in FIG. 1, which uses a cold box 26 mounted on the stand 18 to surround the transmission 20. The cold box 26 and dynamometers may be omitted for other tests.

Figure 3:
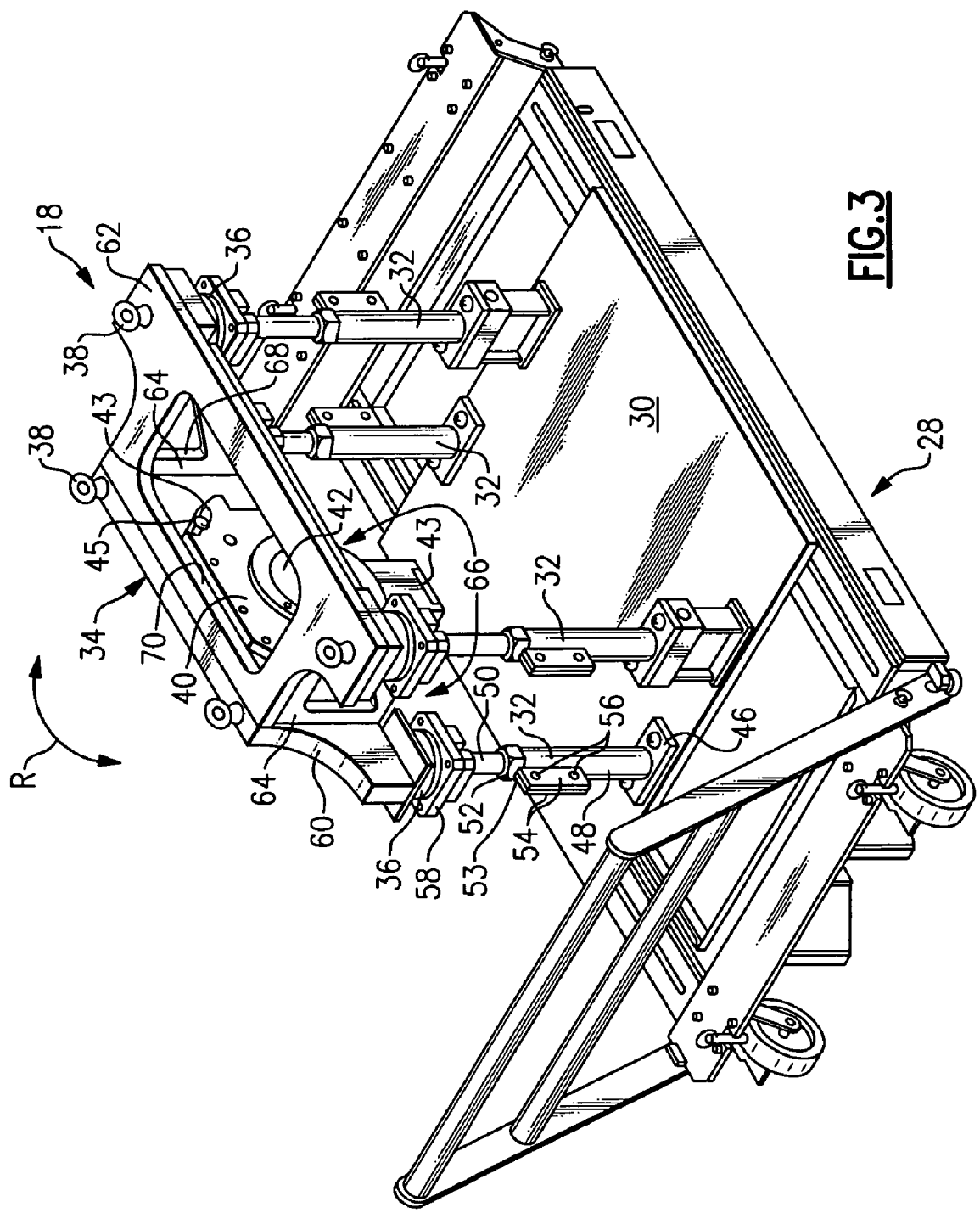
FIG. 3 is a perspective view of the cart and test stand shown in FIGS. 1-2A.

Referring to FIGS. 2A-3, the stand 18 includes a frame 34 that is supported on the base plate 30 by adjustable supports 32, which can be a device such as a screw jack. Dampers 36 are arranged between the adjustable supports 32 and the frame 34 to absorb vibration during the testing procedure. A generally universal headstock 40 is supported by the frame 34. The headstock includes bolt holes in various patterns to accommodate different transmissions. The transmission 20 mounts to the headstock 40, which supports a flex plate 42 that is mounted to an input shaft (not shown) of the transmission, as is well known in the art. A shaft 44 (shown in FIGS. 4 and 5) is secured to the flex plate 42 and is coupled to the drive shaft 16 (shown in FIG. 1).

Figure 4:
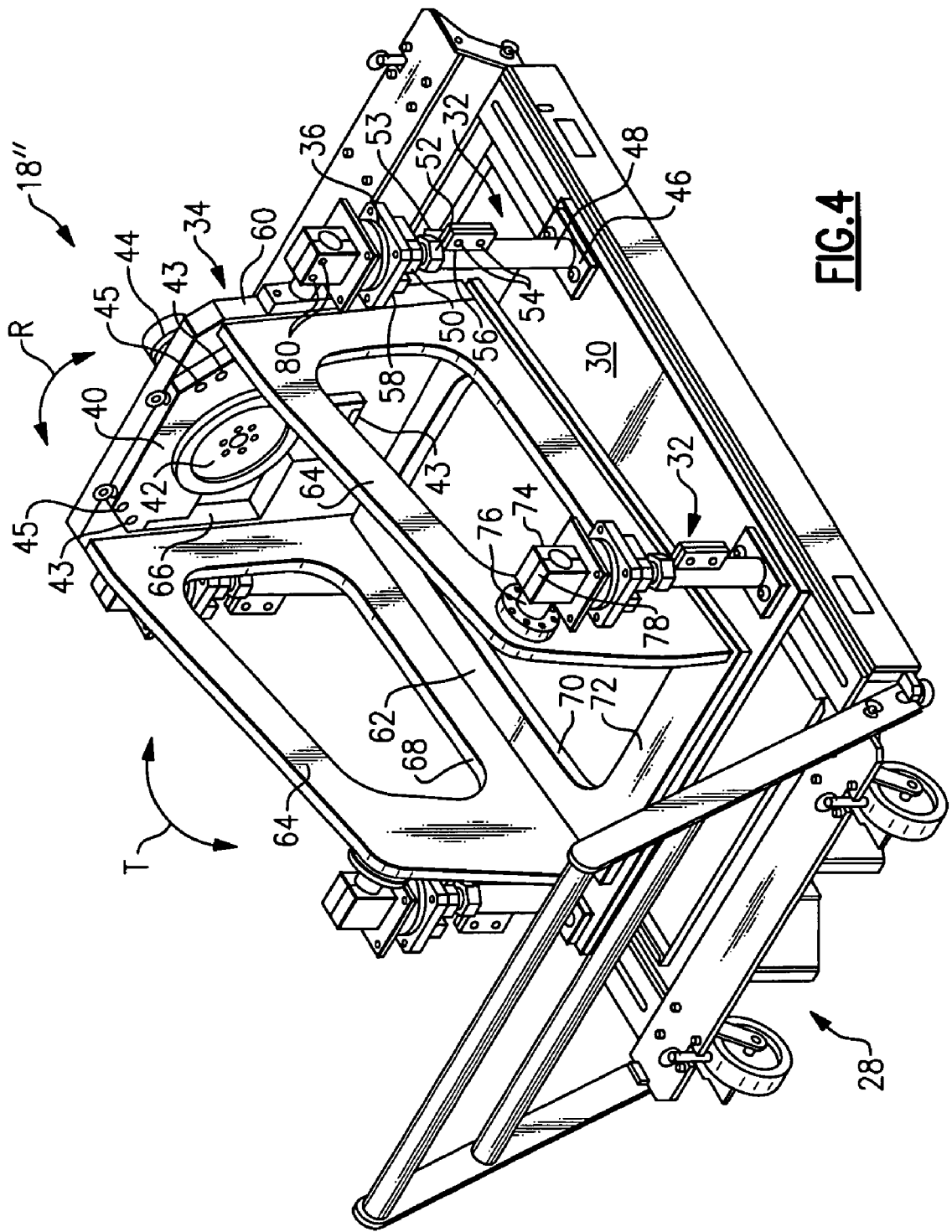
FIG. 4 is a perspective view of another cart and test stand adapted for use with rear wheel drive transmissions.
Figure 5:
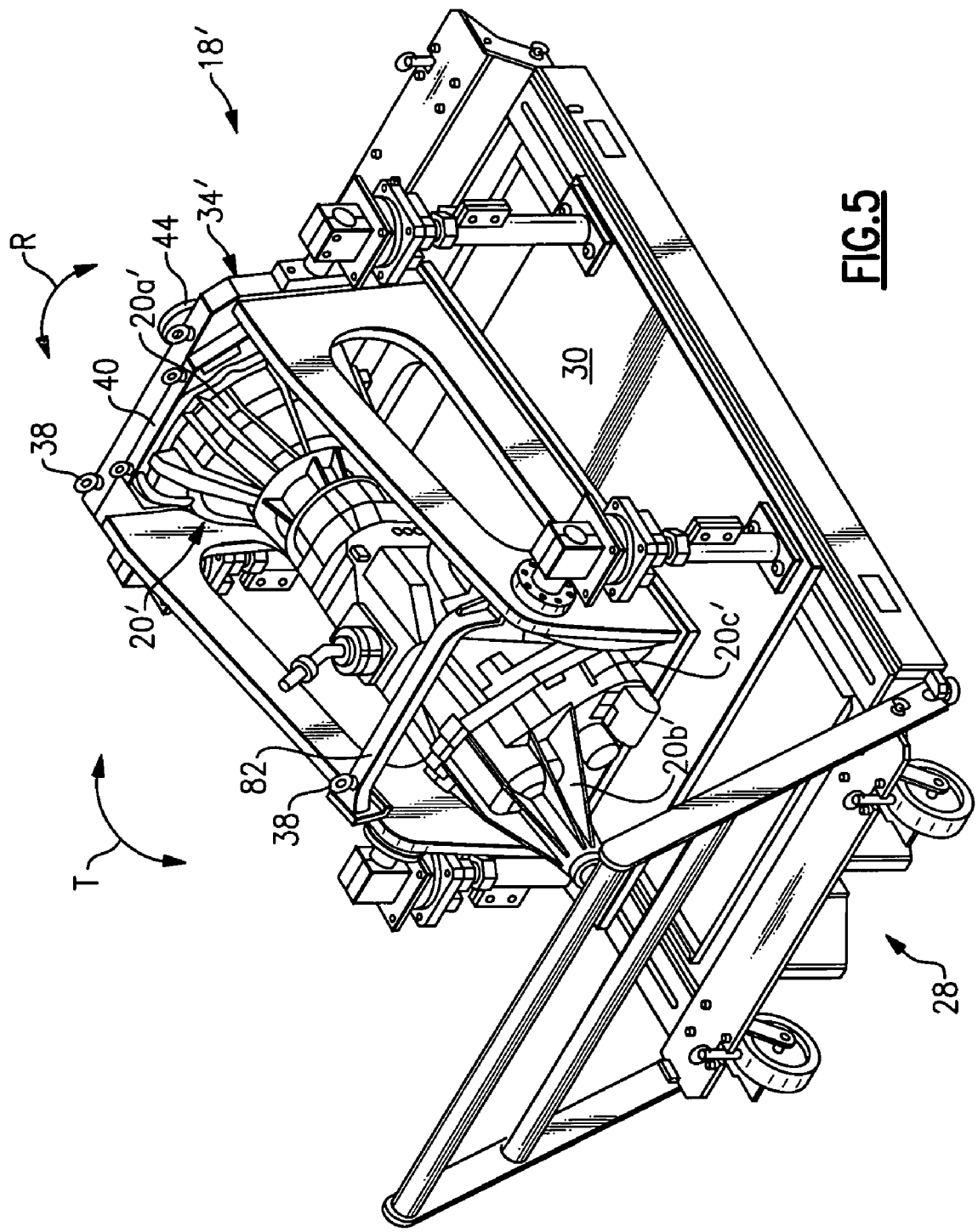
FIG. 5 is a perspective view of another cart and test stand adapted for use with a rear wheel drive transmission having a provision for all wheel drive.

The headstock 40 is common between multiple transmissions, as shown in FIGS. 3-5. The headstock includes arcuate slots 43 that permit rotational angle adjustment R so that a desired rotational position of the transmission 20 can be obtained for the test procedure, in particular for front wheel drive transmissions. The desired rotational angle R is obtained and the headstock 40 is retained relative to the frame 34 by fasteners 45. Alternatively, or in addition, the rotational angle may also be achieved by adjustment of the adjustable supports 32.

With continuing reference to FIG. 3, the adjustable supports 32 include feet 46 that are secured to the base plate 30. A housing 48, which is an internally threaded tube in the example, extends from each foot 46 and supports a screw 50. A collar 52 is rotated relative to the screw 50 to obtain a desired height for each adjustable support 32, and a set screw 53 is used to lock the collar 52 in place relative to the screw 50. Flanges 54 that are spaced from one another are tightened about the screw 50 using fasteners 56 to further maintain the desired vertical position of the screw 50. A top of each screw 50 supports seats 58 to which the dampers 36 are secured. The characteristics of the dampers 36 can be selected to damp a desired frequency and can be tailored for each transmission and test procedure, if desired. The dampers 36 can be active or passive, and any suitable type vibration isolation mount can be employed for the particular application.

Each adjustable support 32 can be adjusted to a desired height to achieve a desired rotation angle R and/or tilt angle T (shown in FIGS. 4 and 5). In the example shown in FIGS. 1-3, the frame 34 is positioned in a generally horizontal orientation using the adjustable supports 32 with no tilt, and the headstock 40 is positioned to obtain the desired rotational angle R.

In the examples of the frame shown in the Figures, the frame 34 is constructed from thick steel plates and includes a vertical member 60 that supports the headstock 40. A horizontal member 62 is welded to the vertical member 60 and further supported by lateral members 64 to provide a rigid structure. Preferably, the vertical member 60 includes open areas 66 (FIGS. 2B and 3) on either side of a central portion of the headstock 40 that depends downwardly. The open areas 66 provide access to the transmission 20 and/or permit a tail 20b (FIG. 2A) of the transmission 20 to extend beneath the vertical member 60. Similarly, the horizontal member 62 and lateral member 64 include apertures 70 and 68, in the examples shown, to provide access to the transmission 20. Eye bolts 38 are secured to the frame 34 so that the frame 34 can be easily positioned using an overhead hoist.

Referring to FIGS. 4 and 5, a head (bell housing) 28' of a transmission 20' is secured to the same headstock 40 as is used in the frame 34 shown in FIG. 3. Block 74 are supported on the dampers 36 and include pin 76 extending there from that secured to the frame 34. The block 74 include slots 78 that permit the block 74 to clamp about the pin 76 using fasteners 80.

A bracket 82 can be secured to a portion of stand 18', shown in FIG. 5 to provide additional stiffness and another lift point for the stand 18'.

A rear portion of the stand 18', 18" they provide a tail support 72 for supporting a tail 20b' and transfer case 20c' (shown in FIG. 5) as would typically be done for a longitudinal transmission 20a if installed into a vehicle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A test unit for testing a powertrain component comprising:
   a generally horizontal base plate;
   a frame spaced from the base plate;
   a headstock secured to the frame and adapted to support a powertrain component; and
   an adjustable support interconnecting the frame to and supporting the frame on the base plate via the adjustable support, the adjustable support movable between multiple positions to achieve a desired orientation of the frame relative to the base plate.

2. The test unit according to claim 1, wherein the frame includes four corners, and the adjustable support is arranged near each of the four corners.

3. The test unit according to claim 1, wherein the adjustable support includes a screw which changes a length of the adjustable support.

4. The test unit according to claim 3, wherein the adjustable support changes the length in a vertical direction.

5. The test unit according to claim 1, wherein the desired orientation includes at least one of a desired rotational angle and tilt angle.

6. The test unit according to claim 1, wherein the frame includes a vertical member secured to a horizontal member and a pair of spaced apart lateral members secured between the vertical and horizontal members, the headstock secured to the vertical member, and the adjustable member secured to at least one of the vertical, horizontal and lateral members.

7. The test unit according to claim 6, wherein the horizontal member includes an aperture for accessing the powertrain component.

8. The test unit according to claim 1, wherein the powertrain component is a vehicle transmission, the headstock including multiple patterns each having multiple holes, the multiple patterns corresponding to different transmission mounts.

9. The test unit according to claim 1, wherein a cold box is supported on the frame surrrounding the powertrain component.

10. The test unit according to claim 1, wherein a damper is arranged between the adjustable support and the frame.

11. A test cell for testing a transmission comprising:
    a motor for driving a transmission; and
    a portable test unit for moving the transmission to and from the test cell in relationship to the motor, the test unit including a movable, generally horizontal base plate and a frame spaced from the base plate, a transmission supported on the frame, and an adjustable support interconnecting the frame to the base plate, the adjustable support movable between multiple positions to achieve a desired orientation of the frame relative to the base plate.

12. The test cell according to claim 11, wherein the desired orientation includes at least one of a desired rotational angle and tilt angle.

13. The test cell according to claim 11, wherein a damper is arranged between the adjustable support and the frame.

14. A method of testing a powertrain component comprising the steps of:
    a) installing a powertrain component onto a frame;
    b) adjusting an orientation of a frame to obtain at least one of a desired rotational angle and tilt angle; and
    c) moving the frame and powertrain component into a test cell.

15. The method according to claim 14, wherein step a) includes installing a transmission onto a headstock of the frame.

16. The method according to claim 14, wherein step b) includes adjusting supports in a vertical direction to obtain a desired length for each of the supports.

17. The method according to claim 16, wherein step b) includes rotating screws to adjust the lengths.

18. The method according to claim 14, comprising the step of selecting a damper to absorbs a vibration from the powertrain component during a test procedure, and arranging the damper between an adjustable support and the frame.

19. The method according to claim 14, wherein the desired rotational angle and tilt angle corresponds to a position of the powertrain component within a vehicle.

20. The test unit according to claim 1, wherein the base plate includes wheels permitting movement of the test unit.

* * * * *

UNITED STATES PATENT AND TRADEMARK OFFICE
CERTIFICATE OF CORRECTION

PATENT NO. : 7,610,819 B2  Page 1 of 1
APPLICATION NO. : 11/496804
DATED : November 3, 2009
INVENTOR(S) : Barnes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Twelfth Day of October, 2010

David J. Kappos
*Director of the United States Patent and Trademark Office*